Figure 1:
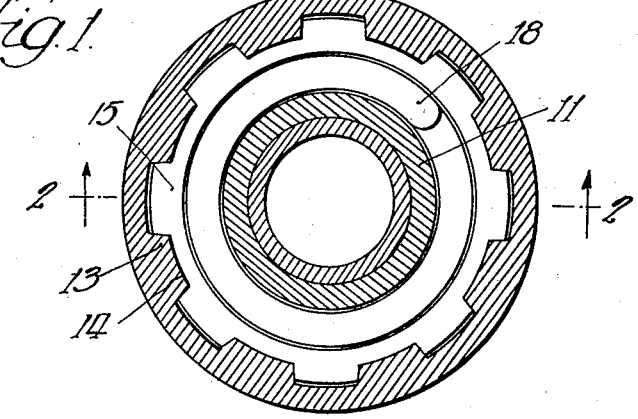

Aug. 23, 1932.   O. B. ANDERSON   1,873,173

CUSHION DIAMOND DRILL CHUCK

Filed Oct. 5, 1929

Inventor
Olof B. Anderson
By Zabel & Banning
Attys

Patented Aug. 23, 1932

1,873,173

UNITED STATES PATENT OFFICE

OLOF B. ANDERSON, OF MARQUETTE, MICHIGAN, ASSIGNOR TO E. J. LONGYEAR MANUFACTURING CO., OF MINNEAPOLIS, MINNESOTA, A CORPORATION OF DELAWARE

CUSHION DIAMOND DRILL CHUCK

Application filed October 5, 1929. Serial No. 397,537.

My invention relates to chucks for holding drills such as is used in drilling holes for exploration, and has for its principal object the provision of means whereby the chuck is cushioned on its mounting so that any unevenness at the face of the drill bit such as is caused by irregularities of the ground through which the bit is passing may be prevented from damaging the bit.

It is also a purpose of this invention to provide a cushioned means of this character whereby the vibration of the bit caused by irregularities of the ground being drilled may be kept from reaching the drilling machine. This results in a considerable saving on the machine because such vibration does a great deal of damage to a machine which is used continually and shortens the life of the machine to a considerable degree.

In the drawing—

Figure 2:
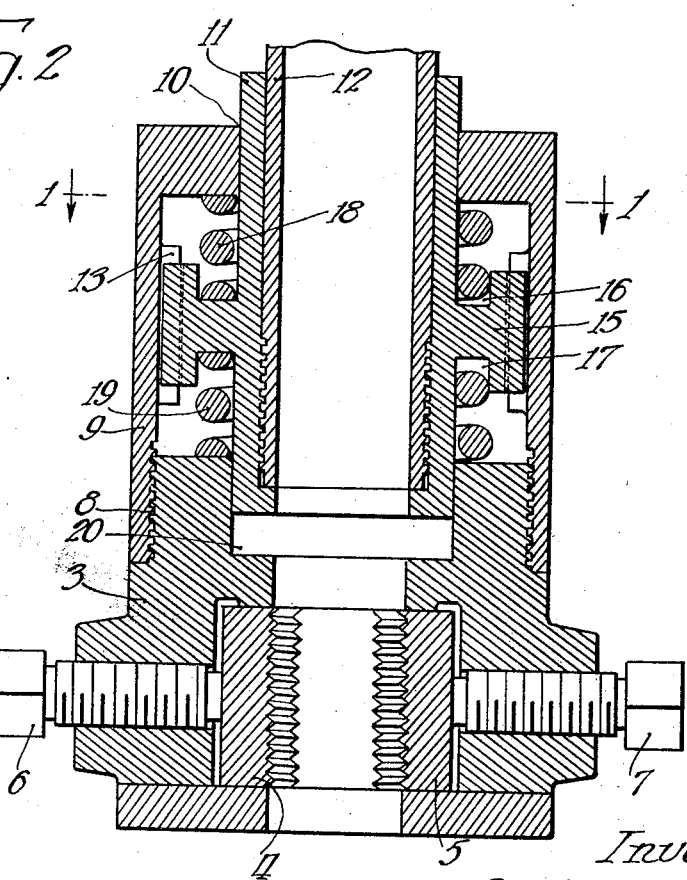

Fig. 1 is a horizontal section taken through the drill chuck and its mounting on line 1—1 of Fig. 2; and Fig. 2 is a vertical section showing the interior construction of the chuck.

Referring now in detail to the drawing, the chuck consists of a head or chuck proper designated by the numeral 3. This chuck carries the gripping jaws such as 4 and 5 which are adjustable to grip the drill stem or release it, the set screws such as 6 and 7 being provided for closing the gripping jaws. This chuck is screw-threaded at 8 to receive an outer sleeve 9 which extends upwardly from the chuck and is provided with an opening 10 at its upper end through which the driving sleeve 11 that is normally screwed onto the spindle 12 of the machine passes.

Now the outer sleeve 9 has around its inner periphery between the screw threads 8 and the top 10 thereof a series of inwardly extending lugs 13 which lugs cooperate with corresponding grooves 14 provided on the radially extending portion 15 of the driving sleeve to prevent relative turning motion between the sleeve 9 and 11 while permitting a sliding motion axially thereof. The portion 15 is, of course, preferably made integral with the sleeve 11, and the lugs 13 are preferably made integral with the sleeve 9. Portion 15 is grooved as shown at 16 and 17 to provide an annular groove between the sleeve 11 and its outer grooved portion. These grooves are not particularly essential, but they form an ideal bearing recess for one end of each of the coil springs 18 and 19, the opposite ends of these coil springs engaging respectively the end of the sleeve 9 and the top of the chuck 3. Sleeve 11 extends into a recess 20 formed in the top of the chuck which recess is preferably deep enough to permit a vertical sliding motion to the full extent allowed by the springs 18 and 19.

Now the action of the device in case of the drill bit which is held in the chuck striking some unevenness that would cause it to exert a greater pressure upwardly is to compress the spring 19 thus moving the sleeve 9 upwardly relative to the sleeve 11 rather than to transmit the jar directly to the sleeve 11 and the spindle 12. The heavy springs 18 and 19 serve to effectively damp out the vibrations of the chuck before they are transmitted to the spindle 12 and by it to the machine itself. The parts of the cushioning means are, of course, enclosed between the sleeves 9 and 11 so that they are fully protected and may with proper oiling last at least the length of life of the chuck itself.

From the above description it is thought that the construction and advantages of this invention will be clear to those skilled in this art. It is also believed to be obvious that various modifications may be made from the details described without departing from the scope of the invention as defined by the appended claims.

Having thus described my invention, what I claim as new and desire to secure by Letters Patent is:

1. Cushioning means for drills and the like comprising a chuck, a spindle, a sleeve carried by said chuck, a sleeve on said spindle, said sleeves having longitudinally running interengaging portions preventing rotative movement therebetween, said sleeves also having members limiting relative axial movement therebetween, and cushioning means opposing said axial movement in both directions.

2. Cushioning means for drills and the like comprising a chuck, a spindle, a sleeve carried by said chuck, a sleeve on said spindle, said sleeves having longitudinally running interengaging portions preventing rotative movement therebetween, said sleeves also having members limiting relative axial movement therebetween, and cushioning means interposed between said sleeves for retarding such axial movement in both directions.

3. Cushioning means for drills and the like comprising a chuck, a spindle, a sleeve carried by said chuck, a sleeve on said spindle, said sleeves having longitudinally running interengaging portions preventing rotative movement therebetween, said sleeves also having members limiting relative axial movement therebetween, and resilient means enclosed by said sleeves for opposing such axial movement in both directions.

4. Cushioning means for drills and the like comprising a chuck, a spindle, a sleeve carried by said chuck, a sleeve on said spindle, said sleeves having longitudinally running interengaging portions preventing rotative movement therebetween, said sleeves also having members limiting relative axial movement therebetween, and a pair of coiled springs interposed between said sleeves for opposing such axial movement in both directions.

5. Cushioning means for drills and the like comprising a chuck, a spindle, a sleeve carried by said chuck and means carried by said spindle extending into said sleeve, said means cooperating with said sleeve to prevent relative rotation between said spindle and chuck and having cushioning means yieldingly permitting a limited axial movement between said chuck and spindle in both directions.

6. Means for cushioning axial thrust between the chuck head and drive spindle of a drilling machine comprising coaxial members fixed to the chuck and drive spindle respectively, elements on said members engaging each other to transmit rotation of said spindle to said chuck, the members being slidable longitudinally relative to each other, longitudinally spaced stops on one of said members, and shoulders on the other member between said stops, and yielding means interposed between said stops and shoulders.

7. Cushioning means for drills and the like comprising a chuck, a spindle coaxial therewith, said chuck and spindle having longitudinally extending interengaging portions connecting them together for rotational movement but permitting axial movement therebetween, longitudinally spaced shoulders on said chuck and spindle limiting axial movement of the chuck relatively to the spindle, and cushioning means between said shoulders.

8. Cushioning means for drills and the like comprising a chuck, a spindle coaxial therewith, said chuck and spindle having longitudinally extending interengaging portions connecting them together for rotational movement but permitting axial movement therebetween, longitudinally spaced shoulders on said chuck and spindle limiting axial movement of the chuck relatively to the spindle and springs between said shoulders.

9. Cushioning means for drills and the like comprising a chuck, a spindle, coaxial telescoping sleeves on said chuck and spindle, said sleeves having longitudinally running interengaging portions thereon, transmitting rotative movement of the spindle to the chuck, cushion members between said sleeves, and longitudinally spaced shoulders between which said cushion members fit, alternate shoulders being fixed to opposite sleeves.

10. Cushioning means for drills and the like comprising a chuck, a spindle, coaxial telescoping sleeves on said chuck and spindle, said sleeves having longitudinally running interengaging portions thereon, transmitting rotative movement of the spindle to the chuck, coiled springs between said sleeves, and longitudinally spaced shoulders between which said coiled springs fit, alternate shoulders being fixed to opposite sleeves.

In witness whereof, I hereunto subscribe my name this 11th day of Sept. A. D., 1929.

OLOF B. ANDERSON.